(12) United States Patent
Yun et al.

(10) Patent No.: US 9,190,022 B2
(45) Date of Patent: Nov. 17, 2015

(54) THREE-DIMENSIONAL DISPLAY DEVICE

(71) Applicant: Samsung Display Co., Ltd., Yongin, Gyeonggi-Do (KR)

(72) Inventors: Hae-Young Yun, Suwon-si (KR); Hee-Seop Kim, Hwaseong-si (KR); Kyoung-Ho Jung, Yongin-si (KR); Seung-Hoon Lee, Hwaseong-si (KR); Hwi Kim, Seoul (KR); Jung-Hwan Yi, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/863,300

(22) Filed: Apr. 15, 2013

(65) Prior Publication Data

US 2013/0229449 A1 Sep. 5, 2013

Related U.S. Application Data

(63) Continuation of application No. 12/731,076, filed on Mar. 24, 2010, now abandoned.

(30) Foreign Application Priority Data

Sep. 3, 2009 (KR) .......................... 10-2009-0083170

(51) Int. Cl.
    *H04N 13/04* (2006.01)
    *G09G 5/14* (2006.01)
    *G02B 27/22* (2006.01)

(52) U.S. Cl.
    CPC .............. *G09G 5/14* (2013.01); *G02B 27/2214* (2013.01); *H04N 13/0404* (2013.01); *H04N 13/0415* (2013.01); *H04N 13/0422* (2013.01); *H04N 13/0447* (2013.01)

(58) Field of Classification Search
    None
    See application file for complete search history.

(56) References Cited

U.S. PATENT DOCUMENTS

| | | | |
|---|---|---|---|
| 3,409,351 A | 11/1968 | Winnek | |
| 5,341,153 A * | 8/1994 | Benzschawel et al. | 345/694 |
| 5,850,269 A * | 12/1998 | Kim | 349/15 |
| 5,991,073 A * | 11/1999 | Woodgate et al. | 359/462 |
| 6,023,277 A * | 2/2000 | Osaka et al. | 345/419 |
| 6,064,424 A | 5/2000 | Van Berkel et al. | |
| 6,702,989 B2 * | 3/2004 | Sacks et al. | 422/89 |
| 6,703,989 B1 * | 3/2004 | Harrold et al. | 345/32 |
| 7,695,178 B2 * | 4/2010 | Suh et al. | 362/612 |

(Continued)

FOREIGN PATENT DOCUMENTS

| | | |
|---|---|---|
| CN | 1721961 A | 1/2006 |
| CN | 1950744 A | 4/2007 |

(Continued)

*Primary Examiner* — Jay Patel
*Assistant Examiner* — Reza Aghevli
(74) *Attorney, Agent, or Firm* — Innovation Counsel LLP

(57) ABSTRACT

A three-dimensional display device comprises a flat display panel and an image-converting sheet disposed on or above the display panel. The display panel comprises a matrix of unit display cells arranged as rows and columns and where the cells are spaced apart to have respective row and column direction pitches. The image-converting sheet comprises a plurality of inclined lenticular lenses where the inclination is set according to the row and column direction pitches so as to reduce perception of Moiré patterns when stereo-scopic images are projected through the image-converting sheet to an observer viewing the display panel as an upright panel having respectively different left and right stereo-scopic image projections.

30 Claims, 11 Drawing Sheets

(56) References Cited

U.S. PATENT DOCUMENTS

| | | | |
|---|---|---|---|
| 7,847,891 B2* | 12/2010 | Kim et al. | 349/106 |
| 7,894,005 B2* | 2/2011 | Kim | 349/15 |
| 7,903,332 B2* | 3/2011 | De Zwart et al. | 359/463 |
| 8,125,143 B2* | 2/2012 | Park et al. | 313/505 |
| 8,339,705 B2* | 12/2012 | Hong et al. | 359/463 |
| 2004/0165263 A1* | 8/2004 | Sudo et al. | 359/462 |
| 2006/0012593 A1* | 1/2006 | Iriguchi et al. | 345/204 |
| 2006/0203336 A1* | 9/2006 | Van Berkel et al. | 359/462 |
| 2007/0188517 A1* | 8/2007 | Takaki | 345/613 |
| 2008/0036853 A1* | 2/2008 | Shestak et al. | 348/51 |
| 2008/0094700 A1* | 4/2008 | Uehara | 359/463 |
| 2008/0204871 A1* | 8/2008 | Mather et al. | 359/462 |
| 2008/0211974 A1 | 9/2008 | Ikebe | |
| 2008/0218433 A1* | 9/2008 | Hong et al. | 345/6 |
| 2008/0218855 A1* | 9/2008 | Van Berkel | 359/463 |
| 2008/0225113 A1* | 9/2008 | Saishu et al. | 348/51 |
| 2008/0239177 A1 | 10/2008 | Sekine et al. | |
| 2008/0259157 A1* | 10/2008 | Van Dalfsen | 348/59 |
| 2009/0015918 A1* | 1/2009 | Morozumi et al. | 359/463 |
| 2009/0046215 A1 | 2/2009 | Shiomi | |
| 2009/0051685 A1* | 2/2009 | Takagi et al. | 345/419 |
| 2009/0052026 A1* | 2/2009 | Takagi et al. | 359/463 |
| 2009/0052027 A1* | 2/2009 | Yamada et al. | 359/463 |
| 2009/0073556 A1* | 3/2009 | Bent-Gourley | 359/463 |
| 2009/0116108 A1* | 5/2009 | Levecq et al. | 359/463 |
| 2009/0190047 A1 | 7/2009 | Oomura | |
| 2009/0213280 A1* | 8/2009 | Yasukawa | 349/5 |
| 2009/0257119 A1 | 10/2009 | Uehara | |
| 2009/0262418 A1* | 10/2009 | Yun et al. | 359/463 |

FOREIGN PATENT DOCUMENTS

| | | |
|---|---|---|
| CN | 101233448 A | 7/2008 |
| CN | 101261368 A | 9/2008 |
| JP | 2000-078617 | 3/2000 |
| JP | 2004-0280052 | 10/2004 |
| JP | 2005-148425 | 6/2005 |
| JP | 2005-309374 | 11/2005 |
| JP | 2006-163278 | 6/2006 |
| JP | 2006-189764 | 7/2006 |
| JP | 2007-188095 | 7/2007 |
| JP | 2007-298995 | 11/2007 |
| JP | 2008-083600 | 4/2008 |
| JP | 2009-053711 | 3/2009 |
| JP | 2009-509187 | 3/2009 |
| WO | 2007015621 | 2/2007 |

\* cited by examiner

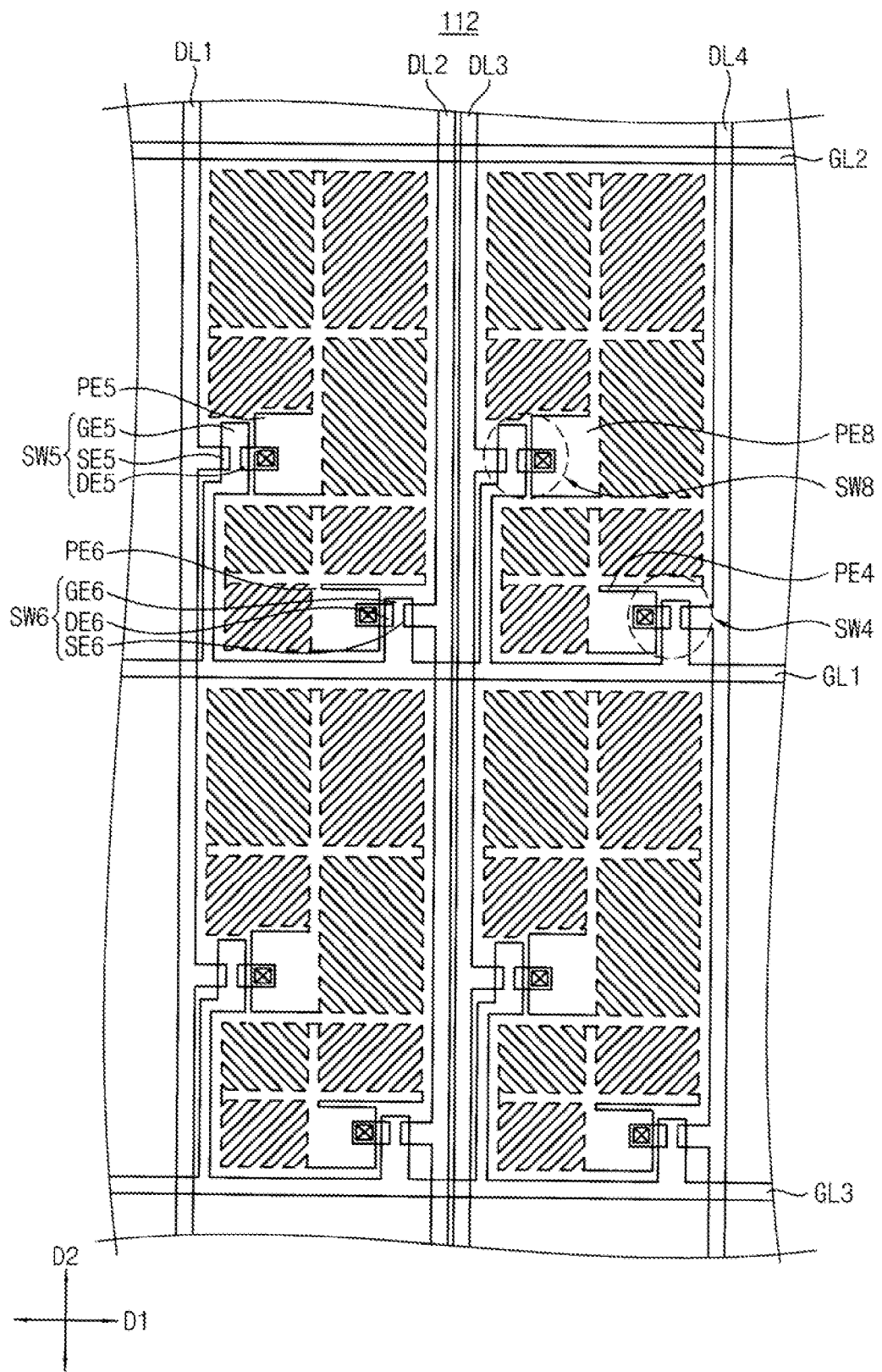

THREE-DIMENSIONAL DISPLAY DEVICE

PRIORITY STATEMENT

This is a continuation of U.S. patent application Ser. No. 12/731,076, filed on Mar. 24, 2010, which application claims priority to Korean Patent Application No. 10-2009-0083170, filed on Sep. 3, 2009 and all the benefits accruing therefrom under 35 U.S.C. §119, where the contents of each of said applications are herein incorporated by reference in their entireties.

BACKGROUND

1. Field of Disclosure

The present disclosure of invention relates to a three-dimensional display device. More particularly, the present disclosure relates to a three-dimensional (3D) display device of a lenticular type.

2. Description of Related Technology

As demand increases for providing three-dimensional stereo-scopic images in the animated display industry such as in the computer game industry, the movie industry and so, attempts to provide a practical 3D display device capable of displaying three-dimensional animated images is ongoing. In one approach to 3D imaging, two different 2-dimensional (2D) images are provided to the left and right eyes of an observer so that a corresponding three-dimensional image may be perceived. For example, the observer watches a pair of 2D images through respective eyes, and the 2D images are mixed in the observer's brain so that a three-dimensional effect may be recognized.

Three-dimensional image display devices include controlled stereo-scopic types and auto stereo-scopic types according to whether a requirement of specific glasses is respectively made or not. In general, the auto stereo-scopic image display devices (no special glasses needed) such as barrier type display devices, lenticular type display devices and so on are used in flat panel display devices where the user does not have ready access to vision controlling goggles. The lenticular type display device refracts in different directions (left and right) the light passing through respective left and right pixels by using a light-directing lens so that the three-dimensional images may be perceived. In the lenticular type display device, most of the light passes through the lens rather than being blocked so that decrease of luminance may be minimized as compared to the barrier type display device where light is blocked.

Generally, a plurality of pixels are arranged in a matrix form on a display panel. An elongated lenticular lens having a corresponding elongation axis may be used where the elongation axis is aligned to a particular arrangement direction of the pixels. In a certain viewing position, the observer may recognize repeated block patterns of the pixels and as a result may not perceive the desired 3D images. For example, in a certain viewing position, the observer may see Moiré patterns or other artifacts on the display panel.

Meanwhile, resolution of multi-view three-dimensional image which changes the three-dimensional effect according to a viewing angle depends on the resolution of the underlying two-dimensional display panel. For example, if the resolution of the two-dimensional display panel is high, the resolution of the three-dimensional image may also be high although not quite as high because resolution is divided amongst left and right visual channels. It may be desirable to increase a size of the display panel to thereby increase the resolution of the two-dimensional display panel, however there is a limit to the size increase of the display panel. In addition, the resolution should be decreased to manufacture multi-view display device using a limited size of the display panel.

BRIEF SUMMARY

In accordance with the disclosure, a three-dimensional display device is provided for reducing occurrence of Moiré patterns, increasing resolution or view points and improving the three-dimensional perception effect.

In an example three-dimensional display device according to the present disclosure, a three-dimensional display device includes a display panel and an image-converting sheet. The display panel includes a first unit cell and a second unit cell. The first unit cell includes a first switching element and a first pixel electrode. The first switching element is connected to a gate line extended in a first direction and a first data line extended in a second direction different from the first direction. The first pixel electrode is connected to the first switching element. The second unit cell is disposed adjacent to the first unit cell in the second direction. The second unit cell includes a second switching element and a second pixel electrode. The second switching element is connected to the gate line and a second data line adjacent to the first data line. The second pixel electrode is connected to the second switching element. The image-converting sheet is disposed on the display panel. The image-converting sheet includes a plurality of inclined lenticular lenses. Each of the lenticular lenses has an elongated lens axis inclined with respect to the data lines.

In another example three-dimensional display device according to the present disclosure, a three-dimensional display device includes a display panel and an image converting sheet. The display panel includes a plurality of unit cells. Each of the unit cells has a first side extended in a first direction and a second side extended in a second direction different from the first direction. The image converting sheet is disposed on the display panel. The image converting sheet includes a plurality of lenticular lenses. Each of the lenticular lenses has a lens axis inclined with respect to the second side. An inclination of the lens axis is defined by dividing a first distance x into a second distance y. (Inclination=y/x.) The first distance x is between a central point of a first unit cell and a central point of a m-th adjacent unit cell from the first unit cell in the first direction. The second distance y is between the central point of the first unit cell and a central point of a n-th adjacent unit cell from the first unit cell in the second direction (m and n are natural numbers and m>n).

In still another example three-dimensional display device according to the present disclosure, a three-dimensional display device includes a display panel and an image converting sheet. The display panel includes a plurality of unit cells. Each of the unit cells includes a plurality of pixel electrodes disposed within an area defined by crossing gate lines extended in a first direction and data lines extended in a second direction different from the first direction. The image converting sheet is disposed on the display panel. The image converting sheet includes a plurality of lenticular lenses. Each of the lenticular lenses has a lens axis inclined with respect to the data line. A first pitch of the display panel is defined as a distance between central points of the adjacent unit cells in the second direction, a second pitch is defined as a distance between central points of the adjacent unit cells in the first direction. The ratio between the first and second pitches is about 1:1.5. An inclination of the lens axis is defined by dividing a first distance x into a second distance y. The first distance is between a central point of a first unit cell and a central point of an m-th adjacent unit cell from the first unit cell in the first direction. The second distance y is between the central point of the first unit cell and a central point of a n-th adjacent unit cell from the first unit cell in the second direction (m and n are natural numbers and m>n).

According to the present disclosure, lenticular lenses are disposed and inclined on a display panel so that Moiré effects may be reduced or minimized. At the same time, by using substantially two independent pixels in a single unit pixel, 2D resolution of the display panel may be increased. Accordingly, three-dimensional resolution and/or view points of three-dimensional display device may be increased so that display quality of the three-dimensional display device may be improved.

In addition, the display device of the present disclosure may be easily manufactured using a landscape type display panel. The display device may be easily used as a portrait type display device without changes of structures.

BRIEF DESCRIPTION OF THE DRAWINGS

The above and other features and advantages of the present disclosure of invention will become more apparent by describing in detailed exemplary embodiments thereof with reference to the accompanying drawings, in which:

FIG. 5A is a plan view illustrating a first substrate of a display panel according to another example embodiment;

DETAILED DESCRIPTION

Figure 1:
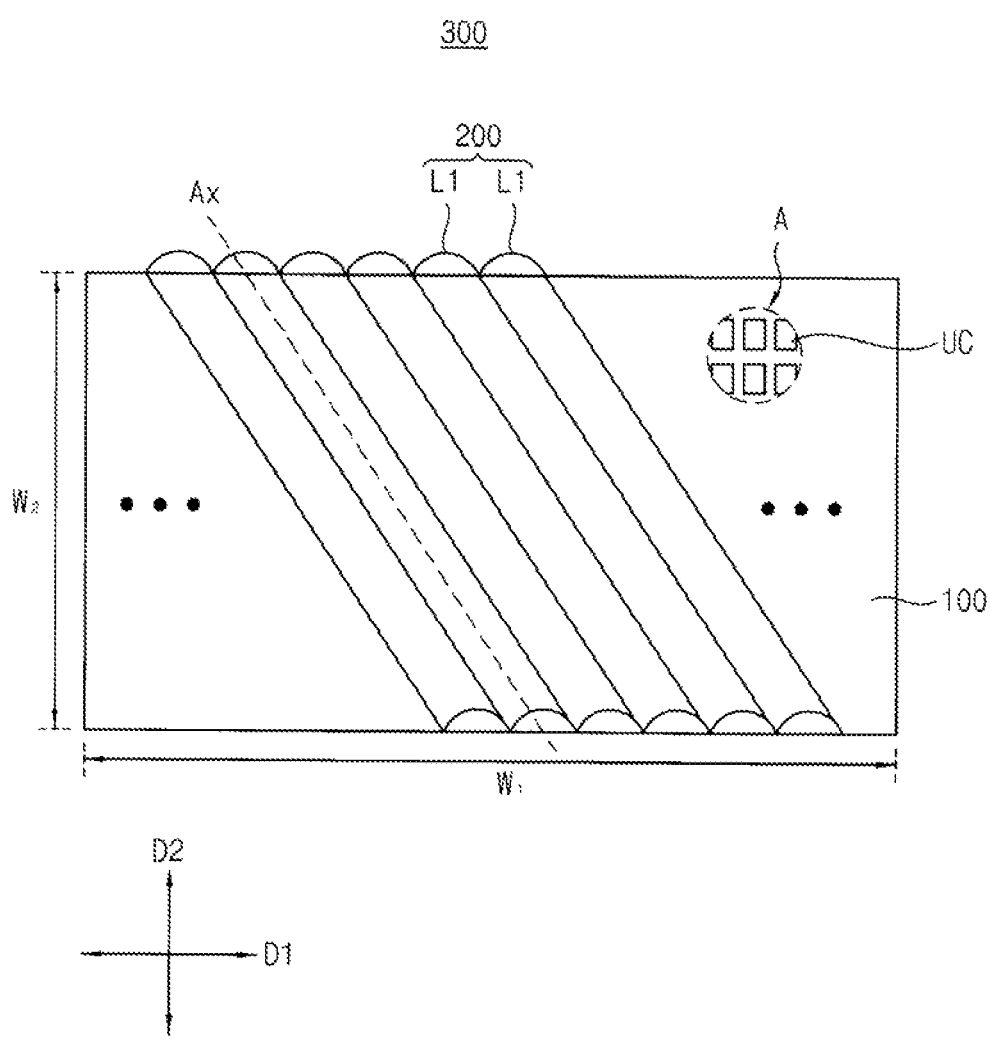
FIG. 1 is a plan view illustrating a three-dimensional image display device according to a first example embodiment.

The present disclosure of invention is provided more fully hereinafter with reference to the accompanying drawings, in which exemplary embodiments are shown. The present teachings may, however, be embodied in many different forms and should not be construed as limited to the exemplary embodiments set fourth herein. Rather, these exemplary embodiments are provided so that this disclosure will be thorough and complete, and will fully convey the scope of the present teachings to those skilled in the relevant art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "lower" other elements or features would then be oriented "upper" the other elements or features. Thus, the exemplary term "lower" can encompass both an orientation of above and below. The apparatus may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described hereinafter with reference to cross sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Methods described herein can be performed in suitable alternate orders unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of a here disclosed invention.

Hereinafter, the present teachings will be explained in detail with reference to the accompanying drawings.

FIG. 1 is a schematic top plan view of a three-dimensional image display device according to an exemplary embodiment.

Figure 2:
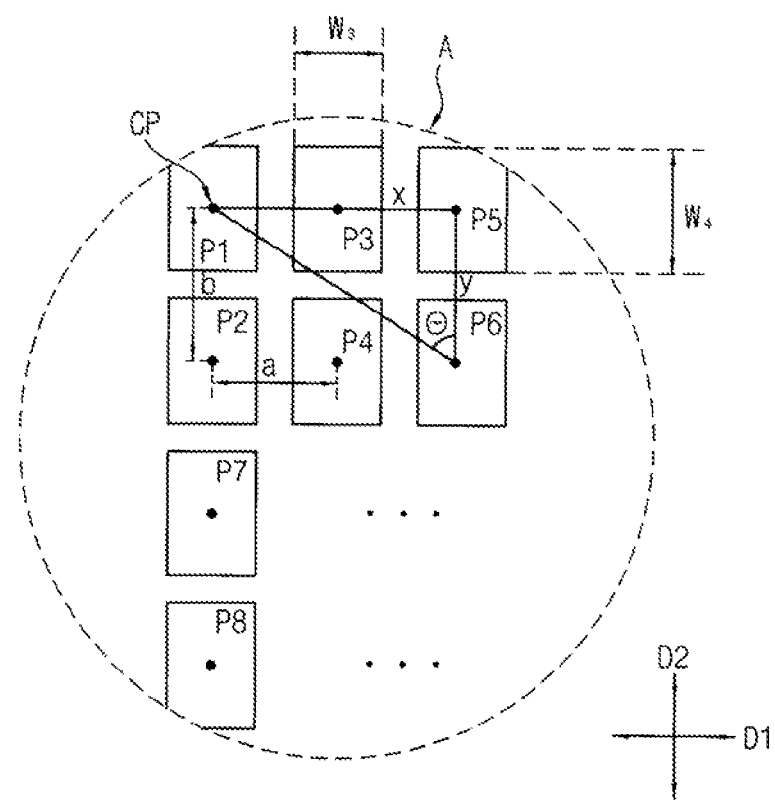
FIG. 2 is a partially enlarged plan view illustrating a portion A in FIG. 1.

FIG. 2 is a partially enlarged view of a portion A in FIG. 1.

Referring to FIGS. 1 and 2, a three-dimensional image display device 300 according to the present example embodiment includes a display panel 100 which can display intermixed 2D images and an image-converting sheet or plate 200 which can convert the intermixed 2D images formed on the display panel 100 into stereo-scopic images.

The display panel 100 has a first width $W_1$ extended in a first direction D1 (horizontal in the illustration) and a second width $W_2$ extended in a second direction D2 (vertical) different from the first direction D1. For example, the second direction D2 may be substantially perpendicular to the first direction D1. The first width $W_1$ may be larger than the second width $W_2$ as shown. The first direction D1 may be a horizontal direction of the display panel 100 and the second direction D2 may be a vertical direction of the display panel 100. Alternatively, the first width $W_1$ may be smaller than the second width $W_2$.

The display panel 100 includes a plurality of unit cells UC. The display panel 100 may include a first substrate 110 (e.g., TFT substrate, refer to FIG. 3A) and a second substrate 120 (e.g., color filters substrate, refer to FIG. 3B) which is combined in spaced apart relationship with the first substrate 110. Each of the unit cells UC may be defined by repeated components which are formed on the first and second substrates 110 and 120. The unit cells UC are further discussed below referring to FIGS. 3A and 3B.

The unit cells UC are repeatedly arranged along the first direction D1 and the second direction D2 to thus form a matrix. A distance between central points CP of the unit cells UC which are adjacent each other in the first direction (horizontal) is defined as "a first pitch a" (shown in FIG. 2) and a distance between central points CP of the unit cells UC which are adjacent each other in the second direction (vertical) is defined as "a second pitch b." Each of the unit cells UC has a respective first side of width $W_3$ extended in the first direction D1 and a second side of width $W_4$ extended in the second direction D2. In one embodiment, a ratio of the first side $W_3$ and the second side $W_4$ may be about 1:1.5.

The example of FIG. 2 shows a plurality of unit cells UC's including a first unit cell denoted as P1, a second unit cell P2 adjacent to the first unit cell P1 in the second direction D2, a third unit cell P3 adjacent to the first unit cell P1 in the first direction D1, a fourth unit cell P4 adjacent to the third unit cell P3 in the second direction D2, a fifth unit cell P5 adjacent to the third unit cell P3 in the first direction D1, a sixth unit cell P6 adjacent to the fifth unit cell P5 in the second direction D2, a seventh unit cell P7 adjacent to the second unit cell P2 in the second direction D2 and an eighth unit cell P8 adjacent to the seventh unit cell P7 in the second direction D2.

The first, third and fifth unit cells P1, P3 and P5 (e.g., R, G, B subpixels) are repeatedly arranged along the first direction D1 to define a first row of the display panel 100. The second, fourth and sixth unit cells P2, P4 and P6 are repeatedly arranged along the second direction D2 to define a second row of the display panel 100. A third row of the display panel 100 including a seventh unit cell P7 is arranged adjacent to the second row along the second direction D2. The first, second, seventh and eighth unit cells P1, P2, P7 and P8 are repeatedly arranged along the second direction D2 to define a first column of the display panel 100. The third and fourth unit cells P3 and P4 are repeatedly arranged along the second direction D2 to define a second column of the display panel 100. The fifth and sixth unit cells P5 and P6 are repeatedly arranged along the second direction D2 to define a third column of the display panel 100.

As mentioned, the distance between the central points of the first unit cell P1 and the third unit cell P3 is a first pitch 'a' and the distance between the central points of the first unit cell P1 and the second unit cell P2 is a second pitch 'b'. In the present example embodiment, the ratio between the first pitch 'a' and the second pitch 'b' is about 1:1.5.

The image converting sheet 200 is disposed on the display panel 100. When the display panel 100 displays one or more (e.g., intermixed) two-dimensional images, the image converting sheet 200 converts the two-dimensional image(s) into the three-dimensional image by refracting the light output for the two-dimensional image(s). In the illustrated embodiment, the image converting sheet 200 includes a plurality of lenticular lenses L1. Each of the lenticular lenses L1 includes a curved surface convexly protruded from the display panel 100. Each lenticular lens L1 may include a curved surface such as the surface of a half of a cylinder. An elongated lens axis, Ax of each lenticular lens L1 is inclined relative to the D2 direction by a certain angle. In other words, the certain angle (θ) is swept between the elongated lens axis, Ax and a reference line (y) extended in the second direction D2. The direction of the lens axis Ax may be extended between the first direction D1 and the second direction D2. The lenticular lenses L1 are arranged substantially parallel with each other and adjacent to each other in the first direction D1.

In FIG. 2, the inclination ratio or slope y/x of the lens axis Ax is defined by dividing a first distance x between the central point CP of the first unit cell P1 and the central point CP of the m-th adjacent unit cell from the first unit cell P1 in the first direction D1 into a second distance y between the central point CP of the first unit cell P1 and the central point CP of the n-th adjacent unit cell from the first unit cell P1 in the second direction D2. In this exemplary embodiment, m and n are natural numbers independent from each other. The greatest common divisor of m and n is 1 and m>n. The extended direction of the lens axis Ax is changeable according to a definition of the first direction D1 and the second direction D2. In the present example embodiment, the inclined angle θ of the lenticular lens L1 is defined as the inclined clockwise angle of the lens axis Ax with respect to a reference line extended in the second direction D2. In this illustrated case, the inclination y/x is a negative value because it is a counterclockwise inclination. Alternatively, the inclination y/x may be a positive value.

For example, m may be 2 and n may be 1. In this case, the first distance x is a distance between the central point CP of the first unit cell P1 and the central point CP of the fifth unit cell P5 which is the second adjacent unit cell from the first unit cell P1 in the first direction D1. The first distance x is twice of the first pitch a. The second distance y is a distance between the central point CP of the first unit cell P1 and the central point CP of the second unit cell P2 which is the first adjacent unit cell from the first unit cell P1 in the second direction D2. The second distance y is equal to the second pitch b. A line connecting the central point CP of the first unit cell P1 and the central point CP of the sixth unit cell P6 is located in the direction of the lens axis Ax. Therefore, in the instant case where a/b is about 2/3, the inclination y/x of the lens axis Ax is about 3/4 (=b/2a) according to the present example embodiment.

In the present example embodiment, the first, third and fifth unit cells P1, P3 and P5 have different colors from one another. The second, fourth, and sixth unit cells P2, P4 and P6 have different colors from one another. The first and second unit cells P1 and P2 have a substantially same color which is referred to as a first color. The third and fourth unit cells P3 and P4 have a substantially same color which is referred to as a second color. The fifth and sixth unit cells P5 and P6 have a substantially same color which is referred to as a third color.

Hereinafter, structures of the unit cells of FIGS. 1 and 2 are explained in detail referring to FIGS. 3A and 3B.

Figure 3A:
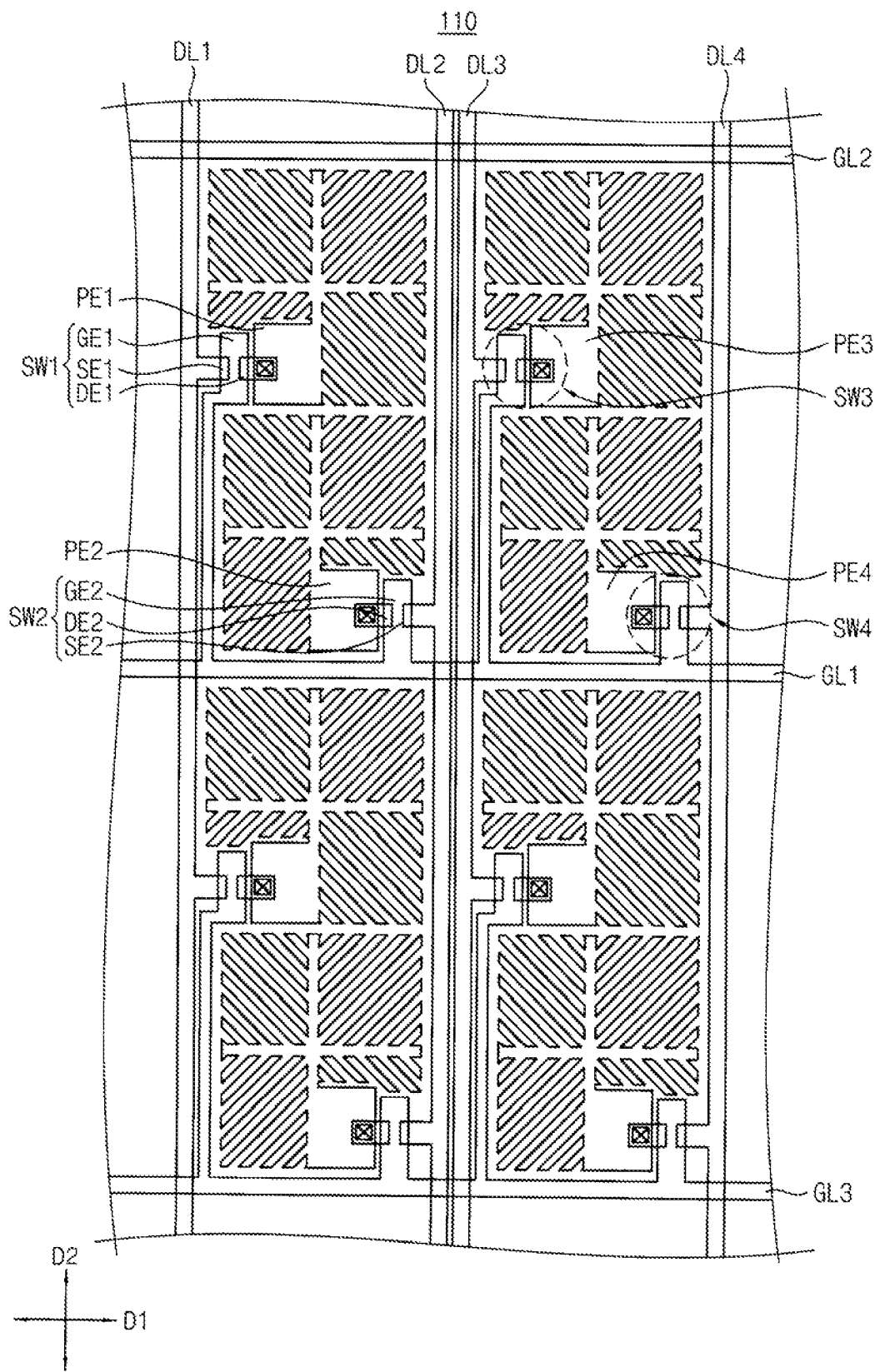
FIG. 3A is a plan view illustrating a first substrate of the display panel of FIG. 1.

FIG. 3A is a plan view of a first substrate of the display panel of FIG. 1.

Referring to FIG. 3A, the first substrate 110 (also TFT substrate), which is a lower substrate of the display panel 100, includes first, second and third gate lines GL1, GL2 and GL3, first, second, third and fourth data lines DL1, DL2, DL3 and DL4, first, second, third and fourth switching elements SW1, SW2, SW3 and SW4 and first, second, third and fourth pixel electrodes PE1, PE2, PE3 and PE4, where the latter four pixel-electrodes respectively correspond to and are selectively charged via the former four switching elements. Note that the first gate line GL1 has vertical stubs extending not only into adjacent SW2 and SW4 but also into the more distal SW1 and SW3 to define the gate electrodes of the four switching elements SW1-SW4. More specifically, the first and second switching elements SW1 and SW2 and the first and second pixel electrodes PE1 and PE2 are formed within a first matrix inner area which is defined by the first and second gate lines GL1 and GL2 and the first and second data lines DL1 and DL2. A gap between the second and third data lines DL2 and DL3 is narrower than a gap between the first and second data lines DL1 and DL2. The areas of the first and second pixel electrodes PE1 and PE2 may be substantially equal to each other. Second and third data lines DL2-DL3 extend adjacent to one another.

In terms of yet more detail, the first unit cell P1 includes the first switching element SW1 and the first pixel electrode PE1. The first switching element SW1 includes a first gate electrode GE1 connected to the first gate line GL1 (via one of the aforementioned vertical stubs) so that the relatively distal first switching element SW1 is electrically connected to the first gate line GL1. The first switching element SW1 includes a first source electrode SE1 connected to the first data line DL1 and a first drain electrode DE1 spaced apart from the first source electrode SE1. The first drain electrode DE1 makes electrical contact (through a contacting via) with the first pixel electrode PE1. When the inner area is bisected by a line extended in the first direction D1, the first pixel electrode PE1 may be disposed in an upper portion of the inner area. In one embodiment, the first pixel electrode PE1 includes a micro slit pattern having a plurality of micro electrodes such as shown.

The second unit cell P2 includes the second switching element SW2 and the second pixel electrode PE2. The second switching element SW2 includes a second gate electrode GE2 connected to the first gate line GL1 by way of one of the shorter vertical stubs so that the second switching element SW2 is electrically connected to the first gate line GL1. The second switching element SW2 includes a second source electrode SE2 connected to the second data line DL2 and a second drain electrode DE2 spaced apart from the second source electrode SE2. The second drain electrode DE2 makes electrical contact with the second pixel electrode PE2. The second pixel electrode PE2 may be disposed in a lower portion of the inner area in the second direction D2. The second pixel electrode PE2 includes a micro slit pattern having a plurality of micro electrodes. The second unit cell P2 is thus controlled (e.g., selectively activated) by the first gate line GL1 in substantially the same manner as the first unit cell P1. A line connecting the central point of the second unit cell P2 and the central point of the first unit cell P1 is extended in the second direction D2 to cross the first gate line GL1.

The third and fourth switching elements SW3 and SW4 and the third and fourth pixel electrodes PE3 and PE4 are formed in an inner area which is defined by the first and second gate lines GL1 and GL2 and the third and fourth data lines DL3 and DL4. The third unit cell P3 includes the third switching element SW3 and the third pixel electrode PE3. Except that the third switching element SW3 is connected to the third data line DL3, the third switching element SW3 is formed substantially the same as the first switching element SW1. The fourth unit cell P4 includes the fourth switching element SW4 and the fourth pixel electrode PE4. Except that the fourth switching element SW4 is connected to the fourth data line DL4, the fourth switching element SW4 is substantially formed the same as the second switching element SW2.

The third unit cell P3 is connected to the first gate line GL1 which is also connected to the first unit cell P1, but the lines (stubs) connecting GL1 to the central point of the third unit cell P3 and to the central point of the first unit cell P1 is extended in the second direction (D2) so as to be substantially orthogonal with the first gate line GL1. The first, second, third and fourth unit cells P1, P2, P3 and P4 may be turned on/off by a respective $V_{Gon}$ or $V_{Goff}$ gate signal applied to the first gate line GL1. The first, second, third and fourth unit cells P1, P2, P3 and P4 are independently driven by data signals applied to the first, second, third and fourth data lines DL1, DL2, DL3 and DL4. For example, two pixels may be said to be substantially formed in the inner area where each pixel has left and right halves or top and bottom halves depending on how the four data lines DL1-DL4 are driven.

Meanwhile in FIG. 2, the seventh unit cell P7 disposed adjacent to but below the second unit cell P2 in the second direction D2 is connected to the third gate line GL3 shown in FIG. 3A to be disposed adjacent to but below the first gate line GL1. The eighth unit cell P8 is also connected to the third gate line GL3.

Figure 3B:
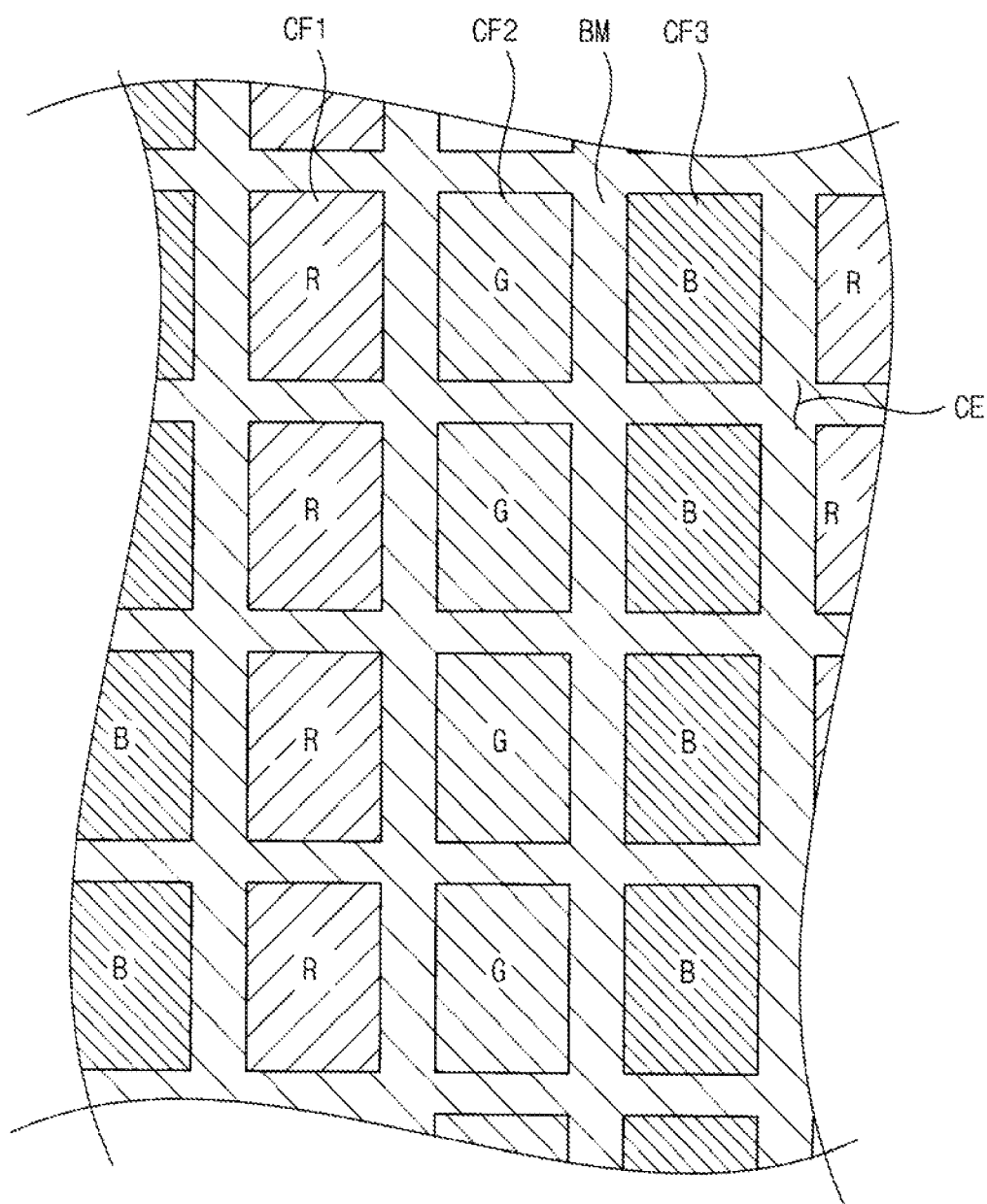
FIG. 3B is a plan view illustrating a second substrate of the display panel of FIG. 1.

FIG. 3B is a plan view of a second substrate 120 (e.g., color filters substrate) of the display panel of FIG. 1.

Referring to FIG. 3B, the second substrate 120 which is an upper substrate of the display panel 100, includes a light blocking pattern BM (black matrix), a first color filter CF1 having an optical bandpass characteristic for displaying the first color, a second color filter CF2 having an optical bandpass characteristic for displaying the second color and a third color filter CF3 having an optical bandpass characteristic for displaying the third color and a common electrode CE extending substantially over the whole area of the second substrate 120.

The light blocking pattern BM is formed at boundaries of the first, second, third, fourth, fifth, sixth, seventh and eighth unit cells P1, P2, P3, P4, P5, P6, P7 and P8. For example, the light blocking pattern BM is formed in areas corresponding to the first, second and third gate lines GL1, GL2 and GL3 and the first, second, third and fourth data lines DL1, DL2, DL3 and DL4, a gap between the first pixel electrode PE1 and the second pixel electrode PE2 and a gap between the third pixel electrode PE3 and the fourth pixel electrode PE4.

Each of the first, second, seventh and eighth unit cells P1, P2, P7 and P8 of the first vertical column includes the first color filter CF1. Each of the third and fourth unit cells P3 and P4 of the second vertical column includes the second color filter CF2. Each of the fifth and sixth unit cells P5 and P6 of the third vertical column includes the third color filter CF3. The first color filter CF1 is formed at least in an area corresponding to the first and second pixel electrodes PE1 and PE2. The second color filter CF2 is formed at least in an area corresponding to the third and fourth pixel electrodes PE3 and PE4.

The common electrode CE is formed on the entire surface of the second substrate 120 without a pattern. Although the common electrode CE does not include the pattern, the display panel 100 may be used substantially the same as a patterned vertical alignment (PVA) mode display panel which includes a patterned pixel electrode and a patterned common electrode due to presence of the micro slit patterns.

As explained hereinbefore, the gate signal is applied to the unit pixels using the first gate line GL1, a data signal applied to the first unit pixel P1 using the first data line DL1 and a data signal applied to the second unit pixel P2 using the second data line DL2. Thus, the inner area is bisected so that two independent pixels are substantially available in the inner area. Thus, according to the present disclosure, even when a width dimension of the color filters in the display device is fixed, the number of pixels arranged in the second direction D2 can still be made twice the number of pixels compared to a display device having one pixel in the matrix inner area. Therefore, resolution of the display panel 100 may substantially increase without doubling the number of gate lines.

In FIGS. 3A and 3B, the first, second and third color filters CF1, CF2 and CF3 are formed on the second substrate 120. However, the first, second and third color filters CF1, CF2 and CF3 may be formed on the first substrate 110. In addition, the light blocking pattern BM may be formed on the first substrate 110.

In FIGS. 3A and 3B, the first, second, third and fourth pixel electrodes PE1, PE2, PE3 and PE4 of the first the display panel 100 include the micro slit pattern and the common electrode CE is formed without the pattern. Alternatively, the display panel 100 may include a conventional PVA mode in which the first, second, third and fourth pixel electrodes PE1, PE2, PE3 and PE4 include a first cutout and the common electrode CE includes a second cutout deviating from the first cutout.

Figure 4:
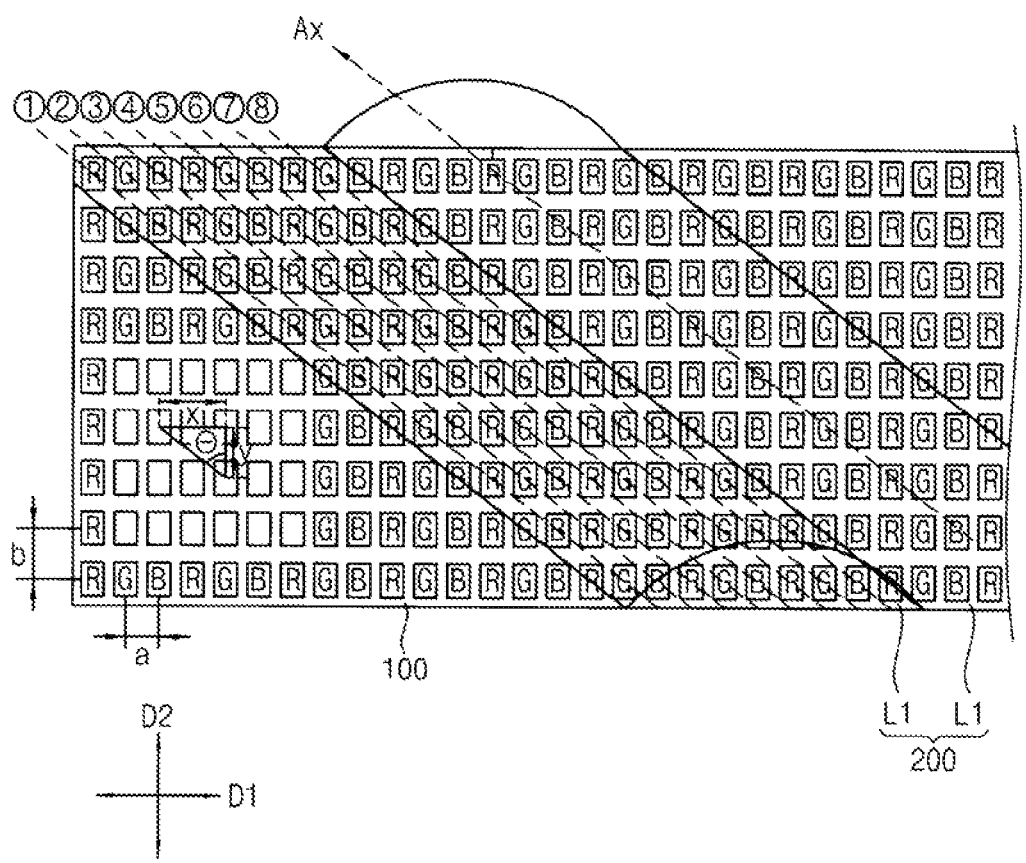
FIG. 4 is a plan view illustrating an arrangement of unit cells and lenticular lenses of the display panel of FIG. 1.

Hereinafter, an arrangement relationship of the unit cells of FIGS. 1-3B and the lenticular lenses is explained in detail by referring to FIG. 4. In FIG. 4, for convenience of explanation, the unit cell displaying the first color is referred to as "a first color cell R," the unit cell displaying the second color is referred to as "a second color cell G," the unit cell displaying the third color is referred to as "a third color cell B." Each of the first, second and third color cells R, G and B is disposed along the first direction D1 and has the first pitch 'a'. Each of the first, second and third color cells R, G and B is disposed along the first direction D2 and has the second pitch 'b' which in one embodiment, is 1.5 times greater than the first pitch a so that the ratio a/b is about 2/3.

FIG. 4 is a plan view illustrating arrangement relationship of unit cells of the display panel of FIG. 1 and lenticular lenses.

Referring to FIG. 4, along the first direction D1, the first, second and third color cells R, G and B are repeatedly arranged. Along the second direction D2, color cells having a substantially same color are repeatedly arranged. The inclination y/x of the lens axis Ax is about 3/4, so that the inclined angle θ of the lens with respect to a line extended in the second direction D2 and the inclination y/x satisfies an equation: tan θ=x/y=4/3. Thus, the inclined angle θ of the lens is about 53.13°. The single lenticular lens L1 having the inclined angle θ is disposed as shown and has a width corresponding to about 8 unit cells arranged along the first direction D1.

The inclination y/x of the lens axis Ax is about 3/4 so that the color cells R, G and B arranged in the matrix shape corresponding to the lenticular lens L1 have substantially the same effect as the color cells R, G and B arranged in an inclined direction along which the lens axis Ax is inclined. For example, in the lenticular lens L1, a first view point line (1) substantially parallel with the lens axis Ax passes through and bisects the first color cell R in a first row, the third color cell B in a second row and the second color cell G in a third row. The first view point line (1) also passes through a boundary portion of the first, second and third color cells R, G and B.

A second view point line (2) substantially parallel with the lens axis Ax and adjacent to the first view point line (1) passes through the second color cell G in the first row, the first color cell R in the second row and the third color cell B in a third row. The second view point line (2) also passes through the boundary portion of the first, second and third color cells R, G and B.

A third, fourth, fifth, sixth, seventh and eighth view point lines (3), (4), (5), (6), (7) and (8) substantially parallel with the third view point line (3) passes through the first, second and third color cells R, G and B in the same way as the first and second view point lines (1) and (2). Thus, though a view point of an observer which view point is located at one side (e.g., left) of the boundary of the first, second, third color cells R, G and B, the observer may see an image displayed by the left diagonal halves of the first, second and third color cells R, G and B while through a view point is located at the other side (e.g., right) of the view point boundary line (e.g., (1)), the observer may see an image displayed by the right diagonal halves of the first, second and third color cells R, G and B.

According to the present example embodiment, the inclination y/x of the lens elongated axis Ax is about 3/4 so that Moiré effects may be reduced or minimized At the same time, two independent pixels are used in the inner area and selectively controlled (activated) by a same one gate line while their respective optical states are independently controlled by a respective pair of data lines, so that resolution of the three-dimensional image display device 300 may increase. For example, horizontal and vertical resolution of a display panel may increase from 1920(RGB)×1080 to 1920(RGB)×1080× 2. The resolution of the display device employing the display panel may increase from 640(RGB)×360×9 points to 960 (RGB)×540×8 points. For example, the resolution of the display panel may increase by twice as high and the resolution of the display device also may increase by twice as high. Therefore, the display quality of the display panel 100 may be improved.

FIG. 5A is a plan view of a first substrate of a display panel according to another exemplary embodiment.

Referring to FIGS. 1, 2 and 5A, a display panel according to the present example embodiment includes a first substrate 112 of FIG. 5A. The first substrate 112 includes first, second and third gate lines GL1, GL2 and GL3, first, second, third and fourth data lines DL1, DL2, DL3 and DL4, fifth, sixth, seventh and eighth switching elements SW5, SW6, SW7 and SW8, and fifth, sixth, seventh and eighth pixel electrodes PE5, PE6, PE7 and PE8.

Except for the respective pixel-electrode areas of the fifth and sixth pixel electrodes PE5 and PE6 and the arrangement position of the fifth and sixth switching elements SW5 and SW6, the fifth and sixth pixel electrodes PE5 and PE6 and the fifth and sixth switching elements SW5 and SW6 are respectively substantially the same as the first and second pixel electrodes PE1 and PE2 and the first and second switching elements SW1 and SW2 according to the previous example embodiment of FIG. 3A. Thus, any repetitive explanation concerning the above elements will be omitted.

The first unit cell P1 of FIG. 2 includes the fifth pixel electrode PE5 and the second unit cell P2 of FIG. 2 includes the sixth pixel electrode PE6. The area of the fifth pixel electrode PE5 is larger than the area of the sixth pixel electrode PE6. For example, the area of the fifth pixel electrode PE5 may be about twice the area of the sixth pixel electrode PE6. A voltage applied to the fifth pixel electrode PE5 may be lower than a voltage applied to the sixth pixel electrode PE6. Accordingly, in the inner area which is defined by the first and second gate lines GL1 and GL2 and the first and second data lines DL1 and DL2, the fifth pixel electrode PE5 may define a low sub pixel and the sixth pixel electrode PE6 may define a high sub pixel.

In FIG. 5A, the area of the fifth electrode PE5 is larger than the area of the sixth electrode PE6. Alternatively, the area of the fifth electrode PE5 may be smaller than the area of the sixth electrode PE6.

The seventh and eighth pixel electrodes PE7 and PE8 and the seventh and eighth switching elements SW7 and SW8 are respectively substantially the same as the fifth and sixth pixel electrodes PE5 and PE6 and the fifth and sixth switching elements SW5 and SW6. Thus, any repetitive explanation concerning the above elements will be omitted.

Figure 5B:
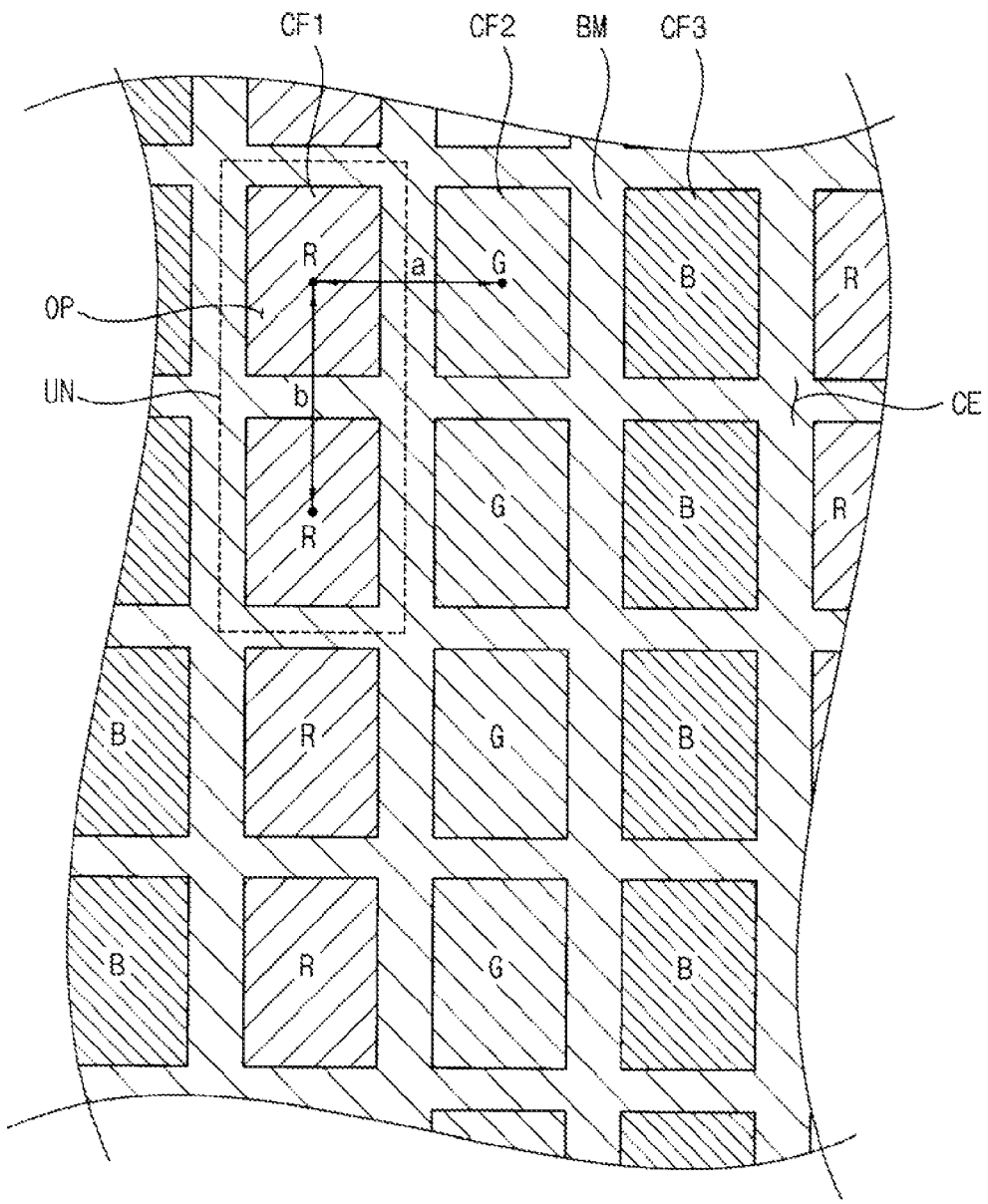
FIG. 5B is a plan view illustrating a second substrate facing the first substrate of FIG. 5A.

FIG. 5B is a plan view of a second substrate corresponding to the first substrate of FIG. 5A.

A second substrate 121 of FIG. 5B is combined with the first substrate 112. The second substrate 121 includes a plurality of openings OP and a light blocking pattern BM and first, second and third color filters CF1, CF2 and CF3 respectively corresponding to the openings OP. The openings OP each have a substantially same area. The light blocking pattern BM may be formed in an area corresponding to the first, second and third gate lines GL1, GL2 and GL3 and the first, second, third and fourth data lines DL1, DL2, DL3 and DL4, and a bisecting region bisecting a unit area UN of the second substrate 121 corresponding to the inner area.

A first pitch 'a' is defined as a distance between central points of openings OP adjacent to each other in a first direction D1. A second pitch 'b' is defined as a distance between central points of openings OP adjacent to each other in a second direction D2 that is different from the first direction D1. A ratio between the first pitch a and the second pitch b is about 1:1.5. A distance between central points of the first color filters CF1 adjacent to each other is substantially the same as the first pitch a, and a distance between central points of the first color filter CF1 and the second color filter CF2 adjacent to the first color filter CF1 is substantially the same as the second pitch b. Thus, referring to FIGS. 2, 5A and 5B, a ratio of the first pitch a of the adjacent unit cells in the first direction D1 and the second pitch b of the adjacent unit cells in the second direction D2 (a:b) is about 1:1.5 in the display panel including the first substrate 112 and the second substrate 121.

Accordingly, the inner area is divided into two regions having different areas by the fifth and sixth pixel electrodes PE5 and PE6. However, the inner area is bisected by the light blocking pattern BM of the second substrate 121 so that two independent pixels are substantially available.

Figure 6:
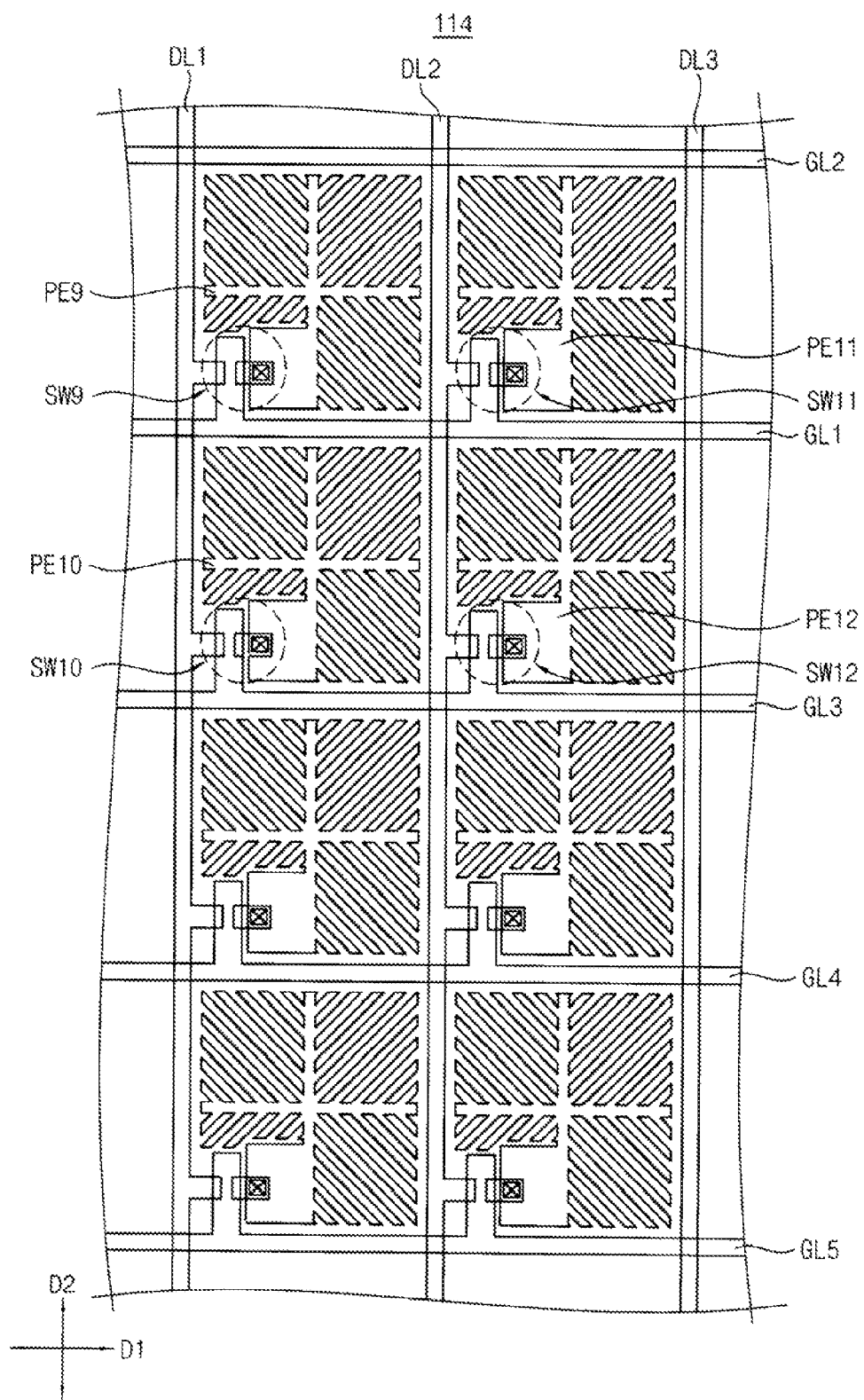
FIG. 6 is a plan view illustrating a first substrate of a display panel according to still another example embodiment.

FIG. 6 is a plan view of a first substrate of a display panel according to still another exemplary embodiment.

Referring to FIGS. 1, 2 and 6, a display panel according to the present example embodiment includes a first substrate 114 of FIG. 6. The first substrate 114 includes first, second, third, fourth and fifth gate lines GL1, GL2, GL3, GL4 and GL5, first, second and third data lines DL1, DL2 and DL3, ninth, tenth, eleventh and twelfth switching elements SW9, SW10, SW11 and SW12 and ninth, tenth, eleventh and twelfth pixel electrodes PE9, PE10, PE11 and PE12. The first, second and third data lines DL1, DL2 and DL3 may be arranged with equal intervals in a first direction D1.

The first, second, third, fourth and fifth gate lines GL1, GL2, GL3, GL4 and GL5 and the first, second and third data lines DL1, DL2 and DL3 define a plurality of inner areas. The ninth, tenth, eleventh and twelfth switching elements SW9, SW10, SW11 and SW12 and the ninth, tenth, eleventh and twelfth pixel electrodes PE9, PE10, PE11 and PE12 are respectively formed in the inner areas.

For example, the ninth switching element SW9 and the ninth pixel electrode PE9 electrically connected to the ninth switching element SW9 are formed in an area defined by the first and second gate lines GL1 and GL2 and the first and second data lines DL1 and DL2. In addition, the tenth switching element SW10 and the tenth pixel electrode PE10 electrically connected to the tenth switching element SW10 are formed in an area defined by the first and third gate lines GL1 and GL3 and the first and second data lines DL1 and DL2.

Referring to FIGS. 2 and 6, a distance between a central point CP of a first unit cell P1 including the ninth pixel electrode PE9 and a central point CP of a third unit cell P3 including the eleventh pixel electrode PE11 defines a first pitch a. A distance between the central point CP of the first unit cell P1 and a central point CP of a second unit cell P2 including the tenth pixel electrode PE10 defines a second pitch b. A ratio between the first pitch a and the second pitch b is about 1:1.5.

Although not shown in figures, each of the ninth, tenth, eleventh and twelfth pixel electrodes PE9, PE10, PE11 and PE12 may include a micro slit pattern.

Comparing to a first gap between the first and second gate lines GL1 and GL2 of FIG. 3A and a second gap between the first and second gate lines GL1 and GL2 of FIG. 6, the second gap may be ½ of the first gap. Thus, according to the present example embodiment, when a size of the display device is fixed, the number of pixels arranged in the second direction D2 may be twice as many as the display device including the gate lines arranged with the first gap.

The first substrate 114 of FIG. 6 may face the second substrate 120 of FIG. 3B.

Figure 7:
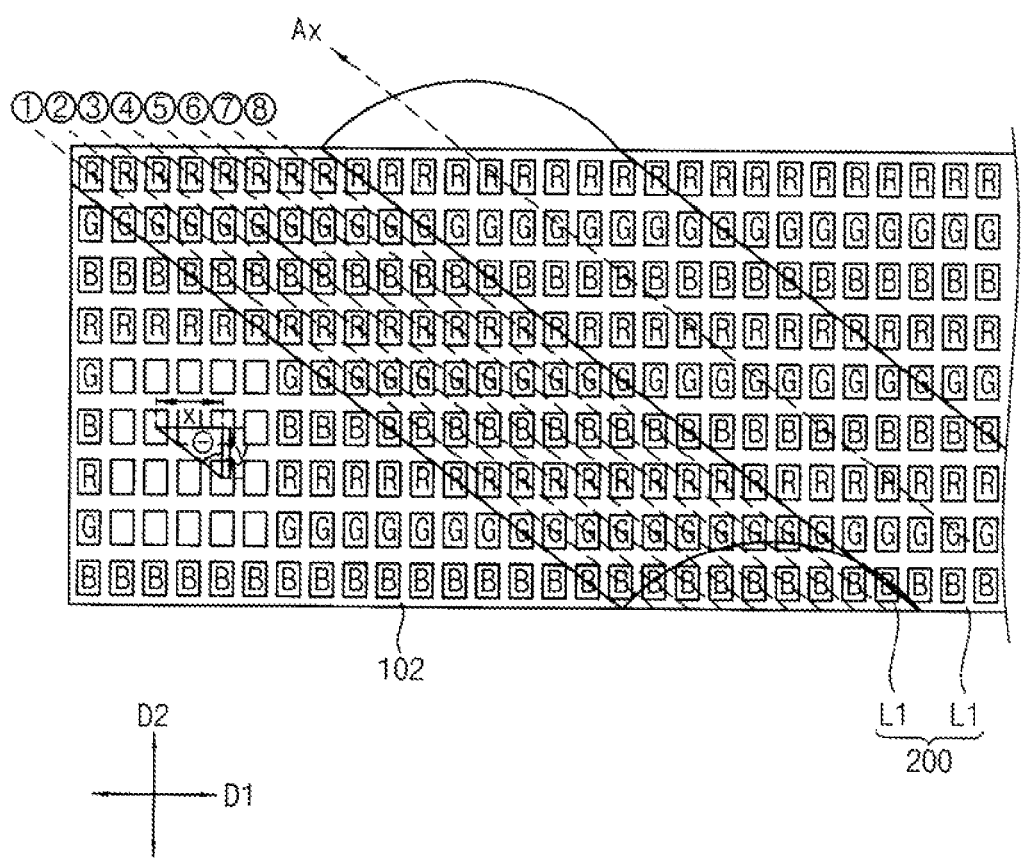
FIG. 7 is a plan view illustrating an arrangement of unit cells and lenticular lenses of a display panel according to still another example embodiment.

FIG. 7 is a plan view illustrating arrangement relationship of unit cells of a display panel according to still another exemplary embodiment.

Except for a 90 degree rotated arrangement of first, second and third color cells R, G and B, a display panel 102 according to the present embodiment is substantially same as the display panel 100 according to the previous example embodiment of FIG. 4. A lenticular lens according to the present embodiment is substantially the same as the lenticular lens according to the previous example embodiment of FIG. 4. Thus, any repetitive explanation concerning the above elements will be omitted.

Referring to FIG. 7, first color cells R are arranged along a first direction D1 of the display panel 102 to define a first row. Second color cells G adjacent to the first color cells R in a second direction D2 are arranged along the first direction D1 to define a second row. Third color cells B adjacent to the second color cells G in a second direction D2 are arranged along the first direction D1 to define a third row. When seeing in the second direction D2, the first, second and third color cells R, G and B are repeatedly arranged so that the first, second and third color cells R, G and B define a column of the display panel 102.

A lenticular lens L1 in which inclination y/x of a lens axis Ax is about 3/4 is disposed on the display panel 102. The inclination y/x of the lens axis Ax is about 3/4 so that the color cells R, G and B arranged in the matrix shape corresponding to the lenticular lens L1 have substantially the same effect as the color cells R, G and B arranged in an inclined direction along which the lens axis Ax is inclined. Although the arrangement of the first, second and third color cells R, G and B of FIG. 7 is different from the arrangement of the first, second and third color cells R, G and B of FIG. 4, relationship between view point lines of the lenticular lens L1 and the first, second and third color cells R, G and B is substantially the same as the relationship between view point lines and the color cells R, G and B of FIG. 4.

The arrangement of the first, second and third color cells R, G and B may depend on an arrangement of first, second and third color filters CF1, CF2 and CF3 including color filters substantially different from each other. For example, the display panel of FIG. 7 include a lower substrate substantially the same as the first substrate of FIG. 3A. An upper substrate of the display panel 102 is explained referring to FIGS. 2 and 8.

Figure 8:
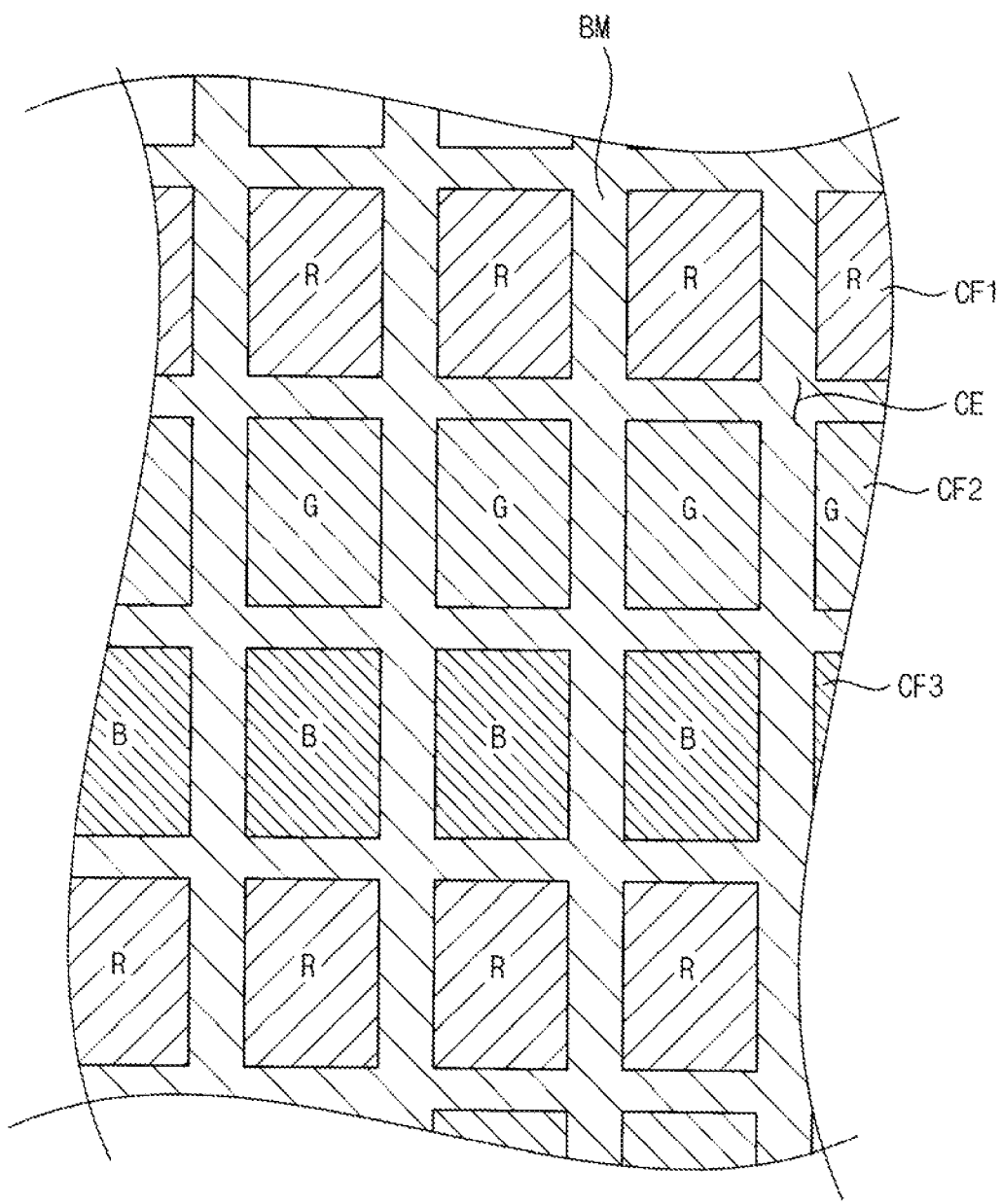
FIG. 8 is a plan view illustrating a second substrate of the display panel of FIG. 7.

FIG. 8 is a plan view of a second substrate of the display panel of FIG. 7.

Referring to FIGS. 2 and 8, a second substrate 122 according to the present example embodiment includes a first color filter CF1 of first, third and fifth unit cells P1, P3 and P5, and a second color filter CF2 of second, fourth and sixth unit cells P2, P4 and P6. A seventh unit cell P7 includes a third color filter CF3 and an eighth unit cell P8 includes the first color filter CF1.

Two different color filters are formed in an inner area defined by a single gate line and a pair of data lines. Although the unit cells including the color filters are connected to the same gate line, the unit cells may be independently driven. Accordingly, the number of pixels arranged in the second direction D2 is twice of the number of pixels of a conventional display panel.

Alternatively, the second substrate 122 of FIG. 8 may be combined with the first substrate 112 of FIG. 5A or the first substrate 114 of FIG. 6 to form a display panel in accordance with the disclosure.

Figure 9:
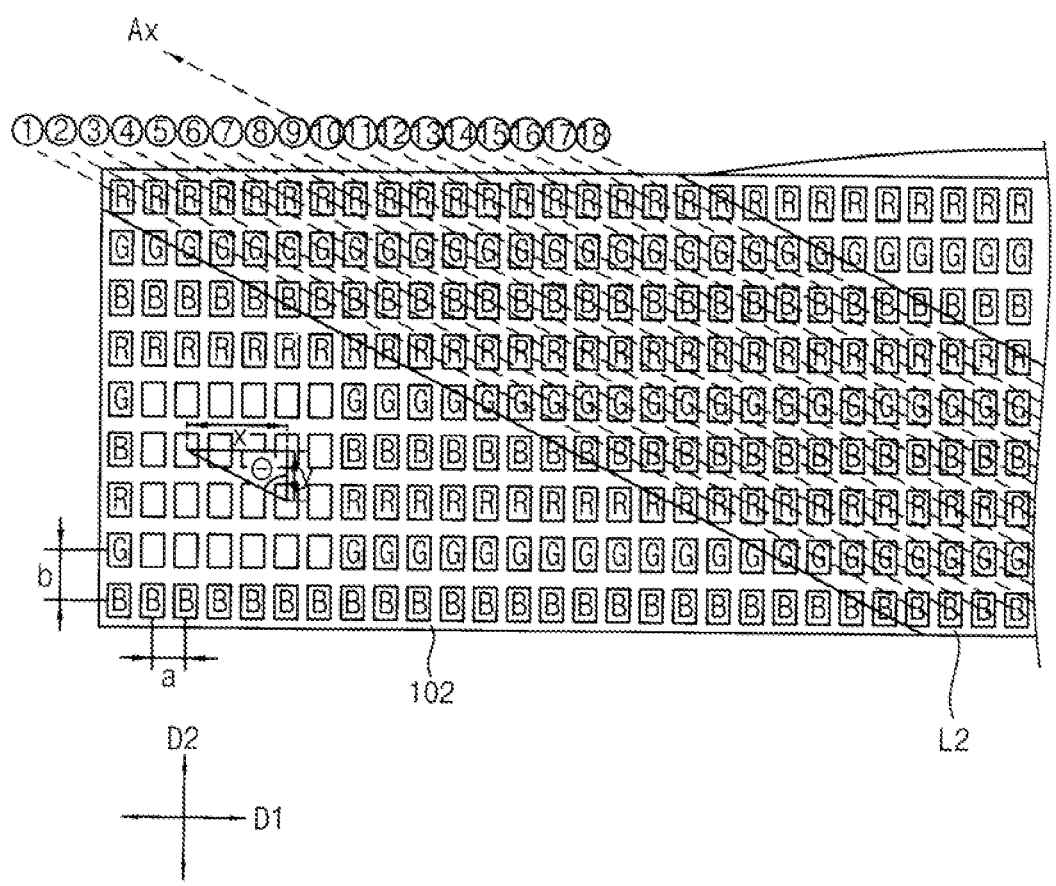
FIG. 9 is a plan view illustrating an arrangement of unit cells and lenticular lenses of a display panel according to still another example embodiment.

FIG. 9 is a plan view illustrating arrangement relationship of unit cells of a display panel according to still another exemplary embodiment.

A display panel 102 according to the present example embodiment is substantially the same as the display panel 100 according to the previous example embodiment of FIG. 4. Thus, any repetitive explanation will be omitted.

A lenticular lens L2 is disposed on the display panel 102. A first distance x which is a first element defining an inclination y/x of a lens axis Ax of the lenticular lens L2 is defined as a distance between a central point of a first of the first color cell R and a central point of a fourth of the first color cell R which is third adjacent color cell in a first direction D1. A second distance y which is a second element defining the inclination y/x of the lens axis Ax of the lenticular lens L2 is defined as a distance between a central point of the first color cell R and a central point of a second color cell G which is first adjacent color cell in a second direction D2.

The first distance x is three times of a first pitch a which is a distance between the adjacent first color cells R. The second distance y is equal to the second pitch b which is a distance between the first color cell R and the adjacent second color cell G. The second pitch b is also equal to a distance between central points of the second color cell G and the adjacent third color cell B in the second direction D2. For example, the inclination y/x of the lenticular lens L2 is equal to b/3a. When a ratio between the first pitch a and the second pitch b is about 1:1.5, the inclination y/x of the lenticular lens L2 is about 1/2.

The inclination y/x of the lens axis Ax is about 1/2 so that the inclined angle θ of the lens with respect to a line extended in the second direction D2 and the inclination satisfy an equation: $\tan\theta = x/y = 2/1$. Thus, the inclined angle θ of the lens is about 63.43°. The single lenticular lens L2 having the inclined angle θ is disposed to have a repeat width corresponding to about 18 unit cells which are arranged along the first direction D1.

The inclination y/x of the lens axis Ax is about 1/2 so that the color cells R, G and B arranged in the matrix shape corresponding to the lenticular lens L2 have substantially the same effect as the color cells R, G and B arranged in an inclined direction along which the lens axis Ax is inclined. For example, in the lenticular lens L2, a first view point line (1) substantially parallel with the lens axis Ax passes through a first of the first color cell R in the first row, a fourth of the second color cell G in the second row and a seventh of the third color cell B in the third row. The first view point line (1) also passes through a boundary portion of the first, second and third color cells R, G and B.

A second view point line (2) substantially parallel with the lens axis Ax and adjacent to the first view point line (1) passes through a second of the first color cell R in the first row, a fifth of the second color cell G in the second row and a eighth of the third color cell B in the third row. The second view point line (2) also passes through the boundary portion of the first, second and third color cells R, G and B. Third, fourth, . . . , seventeenth and eighteenth view point lines (3), (4), . . . , and (18) are parallel with the second view point line (2) and pass through the first, second and third color cells R, G and B in the same way as the first and second view point lines and (17) and (18). Thus, though a view point of an observer is located at the boundary portion of the first, second, third color cells R, G and B, the observer may see an image displayed by the first, second and third color cells R, G and B The lenticular lens L2 having the inclination y/x of the lens axis Ax is about 1/2 is disposed on the display panel 102 so that perception of Moiré patterns or the like may be reduced or minimized. At the same time, by using substantially two independent pixels in the inner area defined by a single gate line and a pair of data lines, resolution in the second direction D2 may increase. For example, horizontal and vertical resolution of a display panel may increase from 1920(RGB)×1080 to 1920×3×720(RGB) by modifying the arrangement of the first, second and third color cells R, G and B. Resolution of a display device employing the display panel may increase from 640(RGB)×360×9 points to 640×360(RGB)×18 points. The resolution of the display device increase by twice as high. Therefore, the display quality of the display panel 102 may be improved.

As mentioned above, the arrangement of the first, second and third color cells R, G and B of the display panel 100 of FIG. 4 and the lenticular lens L1 in which m/n is about 2/1 and the inclination, y/x is about 3/4 is explained. However, a lenticular lens in which the greatest common divisor of m and n is 1, m>n and m is not a multiple of 3 may be also applied to the display panel 100. For example, a lenticular lens in which m/n is about 4/1 and the inclination is 3/8, m/n is about 5/1 and the inclination is about 3/10 and m/n is about 4/3 and the inclination is about 9/8 may be applied to the display panel 100. A lenticular lens in which the greatest common divisor of m and n is 1, m>n and m is a multiple of 3 may be also applied to the display panel 102 having the arrangement of the first, second and third color cells R, G and B of FIG. 7.

The arrangement of the first, second and third color cells R, G and B of the display panel 102 of FIG. 7, the lenticular lens L1 in which m/n is about 2/1 and the inclination is about 3/4 and the lenticular lens L2 in which m/n is about 3/1 and the inclination is about 1/2 is explained. However, a lenticular lens in which greatest common divisor of m and n is 1, m>n and n is not a multiple of 3 may be also applied to the display panel 102. For example, a lenticular lens in which m/n is about 4/1 and the inclination is about 3/8, m/n is about 5/1 and the inclination is about 3/10 and m/n is about 3/2 and the inclination is 1 may be applied to the display panel 102. A lenticular lens in which the greatest common divisor of m and n is 1, m>n and n is a multiple of 3 may be also applied to the display panel 100 having the arrangement of the first, second and third color cells R, G and B of FIG. 4.

According to the display device of the present disclosure of invention, Moiré effects may be reduced or minimized, resolution may increase and three-dimensional effect may be improved. In addition, the display device may be applied to a portable display device, a plasma display panel (PDP) device, a flat panel display device, a three-dimensional game image device, a three-dimensional broadcasting television, a three-dimensional military display device, a three-dimensional display device for simulation training and a three-dimensional medical display device as well as a liquid crystal display (LCD).

Moreover, the display device of the present disclosure may be manufactured easily using a horizontal type display panel. The display device of the present invention may be used as a vertical type display device by rotating the display device without any modifications of structures.

Although the exemplary embodiments in accordance with the disclosure have been described, it is understood that the present disclosure of invention should not be limited to these exemplary embodiments but various changes and modifications can be made by one ordinary skilled in the relevant art after reading this disclosure which changes are within the spirit and scope of the present teachings.

What is claimed is:

1. A display device configured for displaying three-dimensional images comprising:
   a display panel having a plurality of display unit cells disposed as a matrix in the form of rows and columns of successive ones of the unit cells, the successive unit cells being spaced apart one from a successive next with opaque areas disposed between the spaced apart successive unit cells,
   wherein a first pitch between successive unit cells in each row is 'a' and a second pitch between successive unit cells in each column is 'b'; and
   an image-converting element disposed on the display panel and including a plurality of elongated lenticular lenses, each of the lenticular lenses having a longitudinal lens axis inclied with respect to the rows and columns of the matrix wherein the inclination of the lens axis is expressed as a ratio between a first distance, x in a first direction and a second distance, y in a second direction different from the first direction, wherein x is an integer multiple, m of the first pitch 'a' and y is an integer multiple, n of the second pitch 'b', wherein the respective multiples m and n are each greater than one, and wherein
   each of the lenticular lenses has a plurality of regularly spaced apart view point lines respectively associated therewith and projected as so regularly spaced onto the matrix of the underlying display panel, where the view point lines are inclined to be parallel to the longitudinal lens axis, and wherein
   each respective one of the view point lines passes through central points of respective and plural ones of the unit cells, and passes through the respective opaque areas disposed between the unit cells,
   wherein each respective one of the viewpoint lines passes a central portion of the opaque area defined between vertically successive unit cells.

2. The display device of claim 1, wherein the x multiple is greater than the y multiple (said multiples are respectively m and n, and m>n).

3. The display device of claim 1, wherein a ratio between the first and second pitches is about 2/3.

4. The display device of claim 3, wherein an inclined angle of the lens axis as measured relative to a longitudinal side of a matrix column is about 53.13°.

5. The display device of claim 3, wherein an inclined angle of the lens axis as measured relative to a longitudinal side of a matrix column is about 63.43°.

6. The display device of claim 1, wherein each of the display unit cells includes a respective color filter and the color filters of first and second unit cells in a same column have a substantially same color.

7. The display device of claim 1, wherein each of the display unit cells includes a respective color filter and the color filters of immediately successive ones of the unit cells in a same row or a same column have different colors from each other.

8. The display device of claim 1, wherein the plurality of unit display cells includes:
   a first unit cell including a first switching element and a first pixel electrode, the first switching element being connected to a first gate line extended in the first direction and to a first data line extended in the second direction, the first pixel electrode being connected to the first switching element; and
   a second unit cell adjacent the first unit cell in the second direction, the second unit cell including a second switching element and a second pixel electrode, the second switching element being connected to the first gate line and to a second data line extending parallel to the first data line, the second pixel electrode being connected to the second switching element;
   wherein an area of the first pixel electrode is different from that of the second pixel electrode.

9. The display device of claim 8, wherein the display panel further comprises a light blocking pattern disposed between the display unit cells, the light blocking pattern defining said opaque areas disposed between the spaced apart unit cells.

10. The display device of claim 9, wherein the light blocking pattern has openings defined therein and the openings of the light blocking pattern each have a substantially same area.

11. A display device configured for displaying three-dimensional images comprising:
- a display panel comprising a plurality of unit cells disposed as a matrix in the form of rows and columns of successive ones of the unit cells, the successive unit cells being spaced apart one from a successive next with opaque areas disposed between the spaced apart successive unit cells, each of the unit cells having a first side extended in a first direction and a second side extended in a second direction different from the first direction; and
- an image converting element disposed on the display panel and including a plurality of lenticular lenses, each of the lenticular lenses having a lens axis inclined with respect to the second side,
- wherein an inclination of the lens axis is defined by dividing a first distance x into a second distance y, the first distance x is between a central point of a first unit cell and a central point of a m-th unit cell separated from the first unit cell in the first direction, and the second distance y is between the central point of the m—th unit cell and a central point of a n-th unit cell separated from the m—th unit cell in the second direction (m and n are natural numbers and m>n) and wherein
- each of the lenticular lenses has a plurality of regularly spaced apart view point lines respectively associated therewith and projected as so regularly spaced onto the matrix of the underlying display panel, where the view point lines are inclined to be parallel to the longitudinal lens axis, and wherein
- each respective one of the view point lines passes through the respective central points of respective and plural ones of the unit cells, and passes through the respective opaque areas disposed between the unit cells,
- wherein each respective one of the viewpoint lines passes a central portion of the opaque area defined between vertically successive unit cells.

12. The display device of claim 11,
wherein a first pitch a is defined as a distance between central points of the unit cells adjacent to each other in the first direction, a second pitch b is defined as a distance between central points of the unit cells adjacent to each other in the second direction, a ratio between the first and second pitches is about 2/3, the first pitch a and the first distance x satisfy a following equation (1), and the second pitch b and the second distance y satisfy a following equation (2), $$x = a \times m \quad (1)$$

$$y = b \times n \quad (2).$$

13. The display device of claim 11, wherein m/n=2/1 and the inclination of the lens axis is about 4/3.

14. The display device of claim 11, wherein m/n=3/1 and the inclination of the lens axis is about 2/1.

15. The display device of claim 11,
wherein the first unit cell comprises a first switching element connected to a first gate line and a first pixel electrode connected to the first switching element, and
wherein the plurality of unit cells further comprises a second unit cell adjacent to the first unit cell in the second direction, the second unit cell including a second switching element and connected to the first gate line and a second pixel electrode connected to the second switching element.

16. The display device of claim 15, wherein
the display panel further comprises first and second data lines crossing the first gate line and adjacent to each other,
the first switching element is connected to the first data line,
the second switching element is connected to the second data line, and
the first and second pixel electrodes are formed within an area defined by the first gate line and the first and second data lines.

17. The display device of claim 16, wherein a line connecting a central point of the first pixel electrode of the first unit cell with a central point of the second pixel electrode is substantially parallel with the second direction.

18. The display device of claim 15, wherein an area of the first pixel electrode is different from that of the second pixel electrode.

19. The display device of claim 18, wherein
the display panel further comprises a light blocking pattern disposed between the first and second unit cells and including a plurality of openings corresponding to the first and second unit cells respectively, and
a first pitch is defined as a distance between the openings adjacent to each other in the first direction, a second pitch is defined as a distance between the openings adjacent to each other in the second direction and a ratio between the first and second pitches is about 2/3.

20. The display device of claim 15, wherein
unit cells in a first row of the first unit cell arranged along the first direction are connected to the first gate line, unit cells in a second row of the second unit cell arranged along the first direction are connected to the first gate line,
unit cells in a third row adjacent to the unit cells in the second row along the second direction are connected to a second gate line adjacent to the first gate line, and
unit cells in a fourth row adjacent to the unit cells in the third row along the second direction are connected to the second gate line.

21. The display device of claim 11, wherein
unit cells in a first row of the first unit cell arranged along the first direction comprise color filters having different colors, and
unit cells adjacent to the unit cells in the first row along the second direction comprise color filters having a substantially same color.

22. The display device of claim 21, wherein an inclined angle of the lens axis is about 53.13°.

23. The display device of claim 11, wherein unit cells in a first row of the first unit cell arranged along the first direction comprise color filters having a substantially same color, and
unit cells adjacent to the unit cells in the first row along the second direction comprise color filters having different colors.

24. The display device of claim 23, wherein an inclined angle of the lens axis is about 63.43°.

25. The display device of claim 11, wherein a first width of the display panel in the first direction is larger than a second width of the display panel in the second direction.

26. The display device of claim 11, wherein a first width of the display panel in the first direction is smaller than a second width of the display panel in the second direction.

27. A display device configured for displaying three-dimensional images comprising:
- a display panel comprising a plurality of unit cells disposed as a matrix in the form of rows and columns, the unit cells being spaced apart from one another with opaque areas disposed between the spaced apart unit cells, each of the unit cells including a plurality of pixel electrodes disposed within an area defined by crossing gate lines extended in a first direction and data lines extended in a second direction different from the first direction; and an image converting element disposed on the display panel and including a plurality of lenticular lenses, each of the lenticular lenses having a lens axis inclined with respect to the data line, wherein a first pitch of the display panel is defined as a distance between central points of the unit cells adjacent to each other in the second direction, a second pitch is defined as a distance between central points of the unit cells adjacent to each other in the first direction and a ratio between the first and second pitches is about 2/3, and an inclination of the lens axis is defined by dividing a first distance x into a second distance y, the first distance x is between a central point of a first unit cell and a central point of a m-th unit cell separated from the first unit cell in the first direction, and the second distance y is between the central point of the m—th unit cell and a central point of a n-th unit cell separated from the m—th unit cell in the second direction (m and n are natural numbers and m>n) and wherein each of the lenticular lenses has a plurality of view point lines which are inclined to be parallel to the longitudinal lens axis, and wherein each of the view point lines passes through respective central points of the unit cells and through the opaque areas disposed between the unit cells.

28. A three-dimensional display device comprising:

a display panel comprising:

a repeating group that is repeated to populate a display area of the display device in a tessellating manner, where the repeating group comprises:

a first unit cell including a first switching element and a first pixel electrode, the first switching element being connected to a gate line extended through the repeating group in a first direction and a first data line extended through the repeating group in a second direction different from the first direction, the first pixel electrode being connected to the first switching element; and a second unit cell disposed immediately adjacent to the first unit cell in the second direction and including a second switching element and a second pixel electrode, the second switching element being connected to the gate line extended through the repeating group and to a second data line adjacent to the first data line and also extended through the repeating group, the second pixel electrode being connected to the second switching element; and the display panel further comprising:

an image converting element disposed on the display panel and including a plurality of lenticular lenses, each of the lenticular lenses having a lens axis inclined with respect to the first and second data lines.

29. The three-dimensional display device of claim 28, wherein an inclination of the lens axis of each of the lenticular lenses is defined by dividing a first distance x into a second distance y, the first distance x is between a central point of the first unit cell and a central point of a m-th adjacent unit cell from the first unit cell in the first direction, and the second distance y is between the central point of the first unit cell and a central point of a n-th adjacent unit cell from the first unit cell in the second direction (m and n are natural numbers and m>n).

30. The three-dimensional display device of claim 28, wherein a first pitch is defined as a distance between a central point of the first unit cell and a central point of a first adjacent unit cell from the first unit cell in the first direction, a second pitch is defined as a distance between a central point of the first unit cell and a central point of a first adjacent unit cell from the first unit cell in the second direction, and a ratio between the first and second pitches is about 2/3.

\* \* \* \* \*